US012175478B2

(12) United States Patent
Fournier et al.

(10) Patent No.: US 12,175,478 B2
(45) Date of Patent: *Dec. 24, 2024

(54) INTERNET DATA USAGE CONTROL SYSTEM

(71) Applicant: Portable Data Corporation, Oakland, CA (US)

(72) Inventors: James Fournier, Nicasio, CA (US); Victor Grey, Concord, CA (US)

(73) Assignee: PORTABLE DATA CORPORATION, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,359

(22) Filed: Jun. 29, 2023

(65) Prior Publication Data

US 2023/0342789 A1 Oct. 26, 2023

Related U.S. Application Data

(63) Continuation of application No. 16/772,793, filed as application No. PCT/US2018/052089 on Sep. 20, 2018, now Pat. No. 11,727,414.

(Continued)

(51) Int. Cl.
*G06Q 30/02* (2023.01)
*G06Q 10/10* (2023.01)
(Continued)

(52) U.S. Cl.
CPC ........... *G06Q 30/018* (2013.01); *G06Q 10/10* (2013.01); *G06Q 30/0269* (2013.01);
(Continued)

(58) Field of Classification Search
CPC ...... G06Q 30/02; G06Q 30/018; G06Q 10/10; G06Q 30/0269; G06Q 50/18;
(Continued)

(56) References Cited

U.S. PATENT DOCUMENTS 8,249,630 B1 * 8/2012 Reeves ................. H04L 63/068
725/123
8,316,237 B1 * 11/2012 Felsher ................. H04L 63/061
380/282

(Continued)

FOREIGN PATENT DOCUMENTS

WO 2017147692 9/2017
WO 2019070419 4/2019

OTHER PUBLICATIONS

Sotos, J. et al., Blockchains for Data Sharing in Clinical Research: Trust in a Trustless World, Intel, Santa Clara, CA, USA, Blockchain Application Note #1, published May 2017 <URL: https://simplecore.intel.com/itpeernetwork/wp-content/uploads/sites/38/2017/05/Intel_Blockchain_Application_Note1.pdf> [2].

(Continued)

*Primary Examiner* — Thuy N Nguyen
(74) *Attorney, Agent, or Firm* — David R. Stevens; Stevens Law Group (57) ABSTRACT

A method for seamlessly and automatically granting tailored permission for use and transference of Internet data between databases with comprehensive consent is described. The method employs a graph language such as JSON-LD to integrate and employ cryptographically signed Information Sharing Agreements (ISA) between parties. Data is serialized to be easily transferred between databases when appropriate permission is obtained. Granular data exchange under usage control contacts can be automated among any number of parties on the Internet. As such, the method provides a means by which users may control not only what may be done with their data, but to what entity or entities the data may be transferred. Advertisements may then be served to the user according to his or her preferences as defined within (Continued)

a web or desktop app, which is then applied to all related ad publishers publishing to the domains visited by the user.

17 Claims, 5 Drawing Sheets

Related U.S. Application Data (60) Provisional application No. 62/589,334, filed on Nov. 21, 2017, provisional application No. 62/560,714, filed on Sep. 20, 2017.

(51) Int. Cl.
  *G06Q 30/018* (2023.01)
  *G06Q 30/0251* (2023.01)
  *H04L 9/40* (2022.01)
  *G06Q 50/18* (2012.01)

(52) U.S. Cl.
  CPC ........... *H04L 63/102* (2013.01); *G06Q 50/18* (2013.01); *G06Q 2220/00* (2013.01)

(58) Field of Classification Search
  CPC ....... G06Q 2220/00; G06Q 30/0207–30/0277; H04L 63/102
  See application file for complete search history.

(56) References Cited

U.S. PATENT DOCUMENTS

| | | | | |
|---|---|---|---|---|
| 8,688,992 B2* | 4/2014 | Daniels | .............. | H04L 9/3247 726/28 |
| 8,935,904 B2* | 1/2015 | Patel | ............. | B65D 83/38 215/44 |
| 9,106,516 B1* | 8/2015 | Palmans | ............. | G06Q 30/016 |
| 9,613,190 B2* | 4/2017 | Ford | ................. | H04L 63/083 |
| 10,742,420 B1* | 8/2020 | Griffin | ................ | H04L 9/3093 |
| 10,797,885 B1* | 10/2020 | Griffin | ................ | G06F 16/1805 |
| 2002/0004900 A1* | 1/2002 | Patel | ............... | H04L 63/0407 713/155 |
| 2004/0199768 A1* | 10/2004 | Nail | .................. | H04L 9/3247 713/169 |
| 2005/0182773 A1 | 8/2005 | Feinsmith | | |
| 2006/0085344 A1* | 4/2006 | Grim, III | ............ | G06Q 20/40 705/51 |
| 2007/0162377 A1* | 7/2007 | Williams | .............. | G06Q 40/08 705/37 |
| 2009/0132813 A1* | 5/2009 | Schibuk | ............ | G06Q 20/4014 726/9 |
| 2009/0182606 A1* | 7/2009 | Chug | ................. | G06Q 10/0639 705/30 |
| 2011/0055019 A1* | 3/2011 | Coleman | .............. | G06Q 50/265 705/14.66 |
| 2011/0074587 A1* | 3/2011 | Hamm | ................. | G06Q 10/08 340/673 |
| 2011/0113488 A1* | 5/2011 | Schultz | ............... | G06F 21/6245 715/764 |
| 2011/0283365 A1* | 11/2011 | Moritz | .................. | G06F 21/10 726/28 |
| 2012/0290427 A1 | 11/2012 | Reed et al. | | |
| 2013/0006748 A1* | 1/2013 | Horvitz | ................. | G06Q 30/02 705/14.39 |
| 2013/0041755 A1 | 2/2013 | Ivanov et al. | | |
| 2013/0110642 A1* | 5/2013 | Lee | ................... | G06Q 30/0271 705/14.67 |
| 2013/0317914 A1* | 11/2013 | Bhojani | ................ | G06Q 30/02 705/14.66 |
| 2013/0318199 A1* | 11/2013 | Le Jouan | ............... | H04L 67/53 709/217 |
| 2013/0347078 A1* | 12/2013 | Agarwal | .............. | H04L 63/102 709/204 |
| 2014/0006512 A1* | 1/2014 | Huang | ................. | G06Q 30/02 709/204 |
| 2014/0164776 A1* | 6/2014 | Hook | .................. | G06F 21/6218 713/171 |
| 2014/0237610 A1* | 8/2014 | Vandervort | ............. | G06F 21/60 726/26 |
| 2014/0278991 A1* | 9/2014 | Sandoval | ........... | G06Q 30/0257 705/14.55 |
| 2014/0370879 A1* | 12/2014 | Redding | ........... | H04M 3/42178 455/419 |
| 2015/0081349 A1* | 3/2015 | Johndrow | ............ | G06Q 20/405 705/5 |
| 2015/0095971 A1* | 4/2015 | Roffe | ...................... | H04L 63/08 726/1 |
| 2015/0127565 A1* | 5/2015 | Chevalier | .............. | G06Q 10/00 705/319 |
| 2015/0149362 A1* | 5/2015 | Baum | ................... | G06F 21/602 705/51 |
| 2015/0163206 A1* | 6/2015 | McCarthy | ............. | H04L 63/104 726/4 |
| 2015/0200915 A1* | 7/2015 | Yeager | .................... | G06F 16/22 726/26 |
| 2015/0381826 A1* | 12/2015 | Marimuthu | ........... | H04M 15/78 455/405 |
| 2016/0070758 A1* | 3/2016 | Thomson | ............... | G16H 10/60 707/781 |
| 2016/0283740 A1* | 9/2016 | Roundtree | ............ | H04L 63/104 |
| 2016/0300223 A1* | 10/2016 | Grey | ................. | G06Q 20/3825 |
| 2017/0011229 A1* | 1/2017 | Jones-Mcfadden | .......................... G06F 3/04842 | |
| 2017/0109759 A1* | 4/2017 | Korb | ..................... | G06Q 30/018 |
| 2017/0187707 A1* | 6/2017 | Miu | ...................... | H04W 12/062 |
| 2017/0270440 A1* | 9/2017 | Garcia | .................... | G06Q 10/06 |
| 2017/0374060 A1* | 12/2017 | Flamini | ............... | H04L 63/0823 |
| 2018/0121944 A1* | 5/2018 | Schwartz | ........... | G06Q 30/0208 |
| 2018/0144153 A1* | 5/2018 | Pead | ................... | H04L 63/102 |
| 2018/0182052 A1* | 6/2018 | Panagos | ................ | G06Q 20/308 |
| 2018/0227131 A1* | 8/2018 | Ebrahimi | .............. | H04L 9/3297 |
| 2018/0253766 A1* | 9/2018 | Ekambaram | ....... | G06Q 30/0283 |
| 2018/0285941 A1* | 10/2018 | Tricoli | ............... | G06Q 30/0601 |
| 2019/0098501 A1* | 3/2019 | Childress | ............. | G06F 21/31 |
| 2019/0188701 A1 | 6/2019 | Parsons et al. | | |
| 2019/0297471 A1* | 9/2019 | Baer | ................... | H04W 88/184 |
| 2019/0312833 A1* | 10/2019 | Le Jouan | ................ | H04L 63/06 |
| 2020/0050793 A1* | 2/2020 | Roundtree | ............ | H04L 63/104 |
| 2020/0058023 A1 | 2/2020 | Travizano et al. | | |
| 2020/0084051 A1 | 3/2020 | Bessonov et al. | | |

OTHER PUBLICATIONS

Arenas, A. E., "An Event-B approach to Data Sharing Agreements", 8th International Conference on Integrated Formal Methods (IFM 2010), Nancy, France, published 2010 < URL: https://epubs.stfc. ac.uk/manifestation/48912666/STFC-AAM-2021-008.pdf > [2].

Matteucci, I. et al., "CNL4DSA: a controlled natural language for data sharing agreements", Proceedings of the 2010 ACM Symposium on Applied Computing, published 2010 < URL: https://www. researchgate.net/profile/Marco-Sbodio/publication/221001628_CNL4DSA_A_controlled_natural_language_for_data_sharing_agreements/links/0912f50a3602c606dd000000/CNL4DSA-A-controlled-natural-language-for-data-sharing-agreements.pdf > [2].

"Keri: For every DID, a microledger," published Oct. 19, 2020 by Decentralized Identity Foundation, available online at https://medium.com/decentralized-identity/keri-for-every-did-a-microledger-f9457fa80d2d, retrieved and last visited Jun. 17, 2024.

"Microledger, its importance in the world of crypto," published Apr. 20, 2022, available online at https://www.coingabbar.com/en/crypto-blogs-details/microledger-its-importance-in-the-world-of-crypto, retrieved and last visited Jun. 17, 2024.

"Decentralized Identifiers (DIDs) v1.0: Core architecture, data model, and representations," published online by W3C Jul. 19, 2022, available online at https://www.w3.org/TR/vc-data-model/, retrieved and last visited Jun. 19, 2024.

JLINC Protocol Summary, published online by applicant at least as early as 2018, available online at https://jlinc.org/, retrieved and last visited Jun. 19, 2024.

(56) References Cited

OTHER PUBLICATIONS

Detailed JLINC Protocol, published online by applicant at least as early as Mar. 26, 2020, available online at https://protocol.jlinc.org/, retrieved and last visited Jun. 19, 2024.

JLINC Schema, published online by applicant at least as early as Feb. 12, 2019, available online at https://protocol.jlinc.org/schema/, retrieved and last visited Jun. 19, 2024.

JLINC Did Method Specification, published online by applicant at least as early as Oct. 12, 2018, available online at https://did-spec.jlinc.org/, retrieved and last visited Jun. 19, 2024.

"Verifiable Credentials Data Model v1.1," published online by W3C at least as early as Mar. 3, 2022, available online at https://www.w3.org/TR/vc-data-model/, retrieved and last visited Jun. 19, 2024.

"My first impressions of web3," published online at least as early as Jan. 7, 2022, available online at https://moxie.org/2022/01/07/web3-first-impressions.html, retrieved and last visited Jun. 19, 2024.

"Hash Function," Published online by Wikipedia at least as early as May 30, 2020, available online at https://en.wikipedia.org/w/index.php?title=Hash_function&oldid=959841170, retrieved and last visited Jun. 16, 2022.

\* cited by examiner

INTERNET DATA USAGE CONTROL SYSTEM

CROSS REFERENCE TO RELATED APPLICATIONS

This document is a continuation of U.S. Nonprovisional Utility application Ser. No. 16/772,793, entitled "Internet Data Usage Control System," naming as first inventor James Fournier, which was filed on Jun. 14, 2020, which in turn is a national stage entry of Patent Cooperation Treaty Application Ser. No. PCT/US18/52089, entitled "Internet Data Usage Control System," naming as first inventor James Fournier, having an international filing date of Sep. 20, 2018 (hereinafter "the '089 application"), which in turn claims the benefit of the filing date of U.S. Provisional Patent Application No. 62/560,714, entitled "Internet Data Usage Control System," naming as first inventor James Fournier, which was filed on Sep. 20, 2017, which '089 application further claims the benefit of the filing date of U.S. Provisional Patent Application No. 62/589,334, entitled "Internet Data Usage Control System," naming as first inventor James Fournier, which was filed on Nov. 21, 2017, the disclosures of each of which are hereby incorporated entirely herein by reference.

BACKGROUND

1. Technical Field

The present invention relates to Internet data, and more specifically relates to permissioned data exchange among parties over the Internet.

2. Background Art

Data sharing and transfers via networks are ubiquitous in our modern computerized society. Many individuals, groups, companies, organizations, and the like routinely not only share digital data about themselves and things that they know, but also search for data and information about other parties and other things across closed networks, multiple networks, and the Internet. In general, data portability refers to the possibility for a user to have its data moved from one data host to another. Such a user can be an individual, company, or other party, and the user data can be moved by the user itself, or the user can grant permission to another party or entity to move or receive the data or ongoing currently updated copies of the data, such as by a link. Such data hosts can be on a single network, or can be across disparate networks and even the Internet in general. Such data can include data that has been self-created and/or data that has been created about the user as a result of its activities or other information storage.

Data portability can be important with respect to a user, a vendor, and/or other party wishing to obtain or exchange identifying or other pertinent information, such as for a potential purchase or other commercial transaction/exchange. Of course, there can be many drawbacks to the unlimited availability and exchange of identifying or other personal information, and few people are willing to provide their own personal data in a wide open and unrestricted manner. There are almost always requirements, restrictions, or other protections that go along with providing such personal data, as is generally well known.

While the exchange of identifying or other personal data can often be kept under control or restricted when it takes place within a single controlled network or domain, it can be problematic to provide for data portability across multiple disparate servers, networks, or the Internet in general. For example, where a user might wish to obtain information about a particular product, he or she might provide his or her personal information or data on a proprietary website or single network of a known vendor for that type of product, where it might be reasonably expected that such information can be kept safe or protected by a reputable operator of the single website or network. Constantly and repeatedly providing personal information or data can be cumbersome and inefficient though, such as where a user might wish to provide and/or access data from multiple providers, networks, or sites.

In fact, it has become increasingly common simply to provide personal data over the Internet in general, sometimes in ways that are not well secured or protected. The Internet has become the common network connecting many other types of digital networks and devices for communications and data interchange. The increased use of the Internet has led to an increase in the number of applications and services running thereon, the number and value of transactions taking place, and the number and types of relationships that can be formed and maintained electronically. Each of these has in turn increased the importance of trust in online activities. Although a number of known technologies and services have been developed to meet this need, there tend to be drawbacks or limitations to each of that which is currently known.

Presently, there is no automated way to control the use of data after it has been transmitted from one computing device to another computing device, or from one database to another database, using the Internet or other network. There is presently no automated way to verify the chain of custody, or provenance, for data received using the Internet. Additionally, there is presently no protocol available which reconciles and harmonizes the PSD2 regulation and GDPR regulations.

Thus, there is a need for a new system and method by which an entity's data may be controlled, and use of the data may be restricted by the originator of the data securely and automatically according to preferences established by the entity. Additionally, there is a need for a methodized system which employs cryptographically signed, automated agreements between parties, users, or entities for the use and transference of data with full transparency. Such a system provides for a clear chain-of-custody of one's Internet data, and enables users to restrict certain forms of usage and/or transference/sharing. The system is preferably configured to define and describe data so as to facilitate the movement of data from one database to another easily. The system and method preferably employs an existing graph language, and existing PKI—public/private key pairs. Additionally, such a system is preferably architected with a separation of concerns—i.e. roles and points on the system have been separated, which then interact with each other, rather than placing everything within a single server or hub such as a walled garden.

At least one previous attempt at creating a graph-based user-controlled Internet data exchange system has been unsuccessful. XDI aspired to provide built-in data access control via a data graph. However, the effort never achieved a working solution to that objective. XDI was at once over-determined, inefficient, and cumbersome as a graph language, and ultimately failed to work because it was not database friendly. Data could not easily be defined so as to facilitate transfer between databases. XDI named but never functionally defined a "link contract" in a meaningful way for developers. In contrast to XDI, the present invention currently employs JSON-LD as an underlying graph language and then goes on to actually define, create and manage link contracts. This allows the present inventions to facilitate data usage control by users with respect to the data that they share, and to govern how, where, and for what purposes, that obtained data may be used by a recipient via user-defined and mutually agreed permissions.

Additionally, there is a need for a system and protocol that is compatible and compliant with both GDPR and PSD2. The spirit of the European Union General Data Protection Regulation (GDPR) is to empower end-users in their relations with corporations. The JLINC protocol takes this literally, placing the data subject (the data rights holder) at the center of every data event. As Lawrence Lessig has stated, "code is law" and the JLINC protocol of the present invention embodies the spirit of the GDPR in the structure of the protocol.

Another European regulation, the Payment Sendees Directive 2 (PSD2) requires banks to make it easier for financial services to access customer's banking services. This might seem to be in contradiction to the GDPR regulations, but it is believed that by placing the data rights holder at the center of each data event, the system of the present invention makes it possible to satisfy the intent and the text of both regulations.

SUMMARY

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a method and system for establishing cryptographically signed agreements about data-use permission and data ownership between computing devices across the Internet. The agreement selection, signing and exchange may also be automated. Additionally, the present invention is a method for allowing two, or more, entities to exchange data in a manner that allows all parties to cryptographically sign agreed terms using the Internet, or other decentralized network for transport. The present invention uses a novel combination of existing standard protocols and methods to achieve the new objective of creating a decentralized data usage permission control mechanism.

The present invention provides a system and method by which users can not only control which entities may obtain their data when their data is desired by one or more entities, but also control what the entities are permitted do with that data after it has been transmitted or collected. The system involves a mutual signing of Information Sharing Agreements (ISAs), which are conventionally cryptographically signed. The contractual signing of the ISAs is facilitated via a robust, automated system primarily enacted using a graph language, such as JSON-LD. The agreements are legally valid, and are configured to strongly encourage entities to respect the agreements, or face reputation damage and/or legal ramifications.

The system is based on exchanging these ISAs, and the software facilitating the system of the present invention enables users to securely and confidently share data only after the permission and rights to use the data are negotiated and decided.

Most point-to-point data sharing on the Internet is done with some form of access control. Administrators control whether or not users may achieve access or whether data may be exchanged. Currently, when data is exchanged, such as metadata, personal information, browsing information, and similar user data, possession is 9/10th of the law. Once an entity has a user's Internet data, he or she may do whatever they wish with it according to typical current terms of service. This is unfortunate for many common users of the Internet, who do not know that their data is being captured, and have no way of knowing what will be done with it, or who it will be shared with. Once an entity has a user's data, they can do what they wish with it.

Today, graph languages such as JSON-LD make it far easier to move data between databases. The current invention adds agreements about how the data may be used, combined and how such activity may be automated, all in a way that can be cryptographically signed. This has a helpful side effect of helping to move data around between disparate data sources, as it is a common language and form in which to store the data. The system helps to prove what is done with the data, and at what date and time, thereby establishing data provenance. Additionally, the system allows one to prove that both parties agreed to this exchange. Part of the agreement preferably includes options such that the user may turn off any and all access to his/her data, and the other party is bound to comply with the request of the user. The user retains the ability to do this retroactively at any time and to receive a signed verified promise from the other party that they have complied and done so, where a cryptographic hash of the agreement, signed by all parties is held by all parties, and the signed hash is also recorded on the superset of all audit services or ledgers specified by any party.

The system of the present invention instantiates a data protection and exchange system that is secure, cryptographically signed, and automated, which allows the agreements about what can be done with one's data to be exchanged over the Internet so as to govern that data after it is exchanged. This may also be applied to other agreements, including any type of commercial contract or agreements over the Internet. Presently, data exchange can be automatically governed by so-called 'smart-contracts' such as on Ethereum, which are in practice black-boxes where code is obfuscated and as a result the outcome of the contract may only be known when that code is executed. This has resulted in situations where unexpected commercial transactions have occurred and value has been stolen due to software bugs, errors, or fraud. Where code cannot be readily understood, it may cause data to be shared without the user's knowledge, and to parties unknown to the user, or worse. It is an object of the present invention to move away from such ambiguous and obfuscated black-boxes, and provide to the user direct and transparent ongoing control over his or her own contractual agreements and data.

A distributed system (non-centralized), with user control disposed across multiple distributed systems is needed. Unlike Blockchain, the present invention offers a means by which data may be described with a graph language, such as JSON-LD, which effectively defines and maps the user data so as to allow seamless transfer of the data from one database to another.

In order to facilitate permissioned data exchange between entities, the data has to be described in a specific way in order to be moved successfully from one database to another. As such, the data must be serialized in order to do so. With a graph language, data can be moved between databases. However, many entities will not permit such exchanges without agreements in place about exactly which data may be exchanged, and what may be done with that data after it is moved. Specific data from databases may be shared via a graph language, but this remains problematic in the absence of an automated agreement regarding what may be done with the data once acquired. The present invention provides a mechanism whereby that agreement is itself written in the graph language, and is expressed in a way that both computers and people may comprehend. The agreement can be signed with standard PKI, and once the agreement is transmitted, a link to the agreement is contained within an audit record of the agreement, so that both parties can show and any 3rd party can irrefutably confirm that the agreement that they each hold was also signed by the other party and is valid.

The present invention, referenced as JLINC, uses JSON-LD to express human and machine readable contracts governing what may be done with the data, and an audit trail is easily referenced and maintained within the transfer agreement itself, so that the entities may be held both legally responsible and accountable by reputation. Once companies (entities) sign a binding agreement that they can be held accountable for, both via reputation and legally, then they are much more likely to comply. Companies anywhere in the world that hold or process personal data for EU citizens can be penalized for noncompliance with GDPR by fines of up to 4% of global turnover.

Additionally, the system of the present invention is applicable to three-party interactions, and enables the data rights holder the capacity to maintain control over who has access to his/her data, as well as what may be done with the data after acquisition. The parties involved need not be limited to data holders, financial institutions, and companies, but may also include devices, businesses, and IOT devices manufactured by corporations.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DESCRIPTION

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a system and method by which data may be easily defined, mapped, and transferred among databases while permitted, and only when permitted.

Permissions are negotiated via cryptographically signed Information Sharing Agreements (ISAs), which are legally binding. The agreements ensure that data obtained is only used for purposes which is it permitted to be used for, and that data is only transferred to other parties when permitted. The system and method of the present invention employs JSON-LD, a data graph language by which administrators may define data transferal, and then adds a new layer by which owners may define and agree permissions associated with the data.

For example, say a user is interested in purchasing a car. So the user discloses to a vendor, via an ISA agreement, stating that he or she is interested in a vehicle today. The data is related to the intent or interest of the user in a vehicle. The user may later request the data to be returned or destroyed. This is of high value to both the user and the vendor. They are required to abide by the interest of the user, but it is in their interest as well to protect their reputation. The vendor does not have much to gain from stealing that data. Instead, by honoring the agreement, the reputation of the company is maintained and developed. Once the company fully embraces the new system it also benefits from better quality data at vastly-reduced data maintenance cost, allowing more sales resources to be focused on serious buyers rather than wasting effort antagonizing currently uninterested customers, who recently bought a car for example.

The system and method of the present invention may also be applied to the web advertising space, wherein a user may set his/her preferences across a network of publishers, and be served ads that conform to their interests while remaining essentially anonymous to the advertisers, and without being tracked the way that conventional ad tracking works.

The system of the present invention may be used for both credentialed users of a website, or for those that are not (or not yet) a user of the site. In such scenarios, the non-logged in user viewing a site may tailor his or her ad experience (and in turn, qualify usage of his or her anonymous user data), but wishes to view a site with the ad option, without having to disclose their actual identity, and without having to log-in. As such, the present invention enables users to remain anonymous, but to also have ads that are customized to them.

The system of the present invention is architected with a data graph language, such as JSON-LD, an open software protocol gaining prominence in use on the Internet. JSON-LD is a new graph language. The system, referenced as JLINC, is expressed in this graph language, and adds cryptographically signed contracts and usage control, which is also written in the graph language. The system of the present invention is architected in this fashion in order to split or separate the end points of the data exchange—namely, between two adversarial entities. This "Separation of Concerns" concept is important to the essence of the present invention, which help expand the scale and scope of the system of the present invention to include not only the use/exchange of data, but to other online contracts and agreements as well. The audit trail of the contract that is completed is held by a fourth party, and a third party could supply a standard contract, or be a verified attribute provider (such as verification of age/location/etc.) This separation facilitated by the present invention allows for a protocol base for this on the Internet.

It should be understood that the sharing of user data among entities is especially relevant with respect to advertisements. Companies wish to advertise to users who have an interest in their product or service. Corollary companies, or those which provide goods or services similar to those of other companies, often wish to exchange user data for mutual benefit. As such, much of the exchange of user data pertains to advertising. The system of the present invention includes a robust web application and desktop application, which interface with websites of these entities, to enable users to set broad permissions pertaining to their interests and user data preferences which are enacted globally to all entities (ad publishers to domains, as well as the companies of the domains themselves) equipped with the data access control system of the present invention.

The following terms are to be defined as follows as they pertain to the process and use of the system and method of the present invention:

Publisher—a content provider, which hosts ads on a website at a domain that it controls.

User—the individual consumer of content and ads via a web browser.

Ad Network—ad content provider contracting with the Publisher to deliver ads to the User.

Ad Preferences—a set of specific choices made by the User in response to a set of options presented, these could include what types of ads, in what interest area, from whom, etc.

ADprefs—a JLINC enabled domain where a User can set and manage their Ad Preferences.

Figure 1:
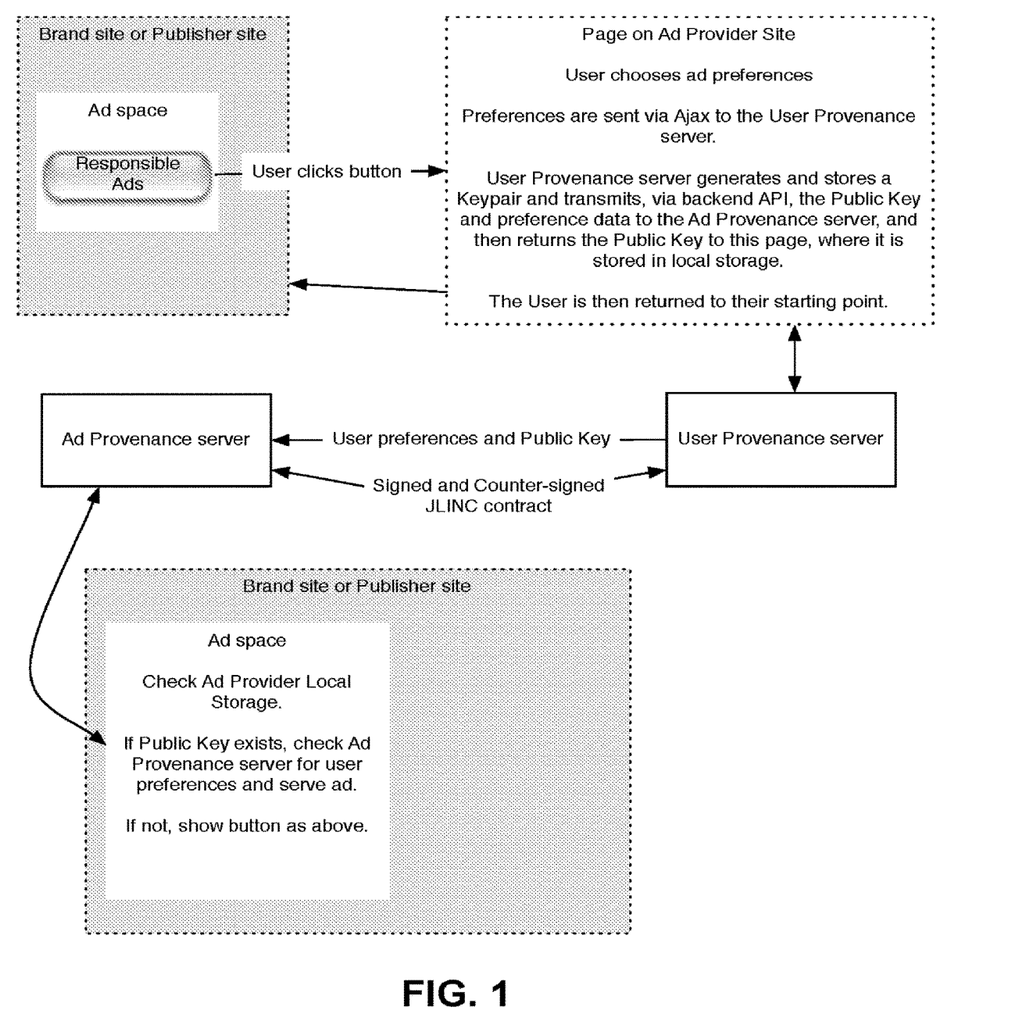
FIG. 1 depicts a diagram of the components required in the implementation and use of the method of the present invention as it relates to advertising.
Figure 2:
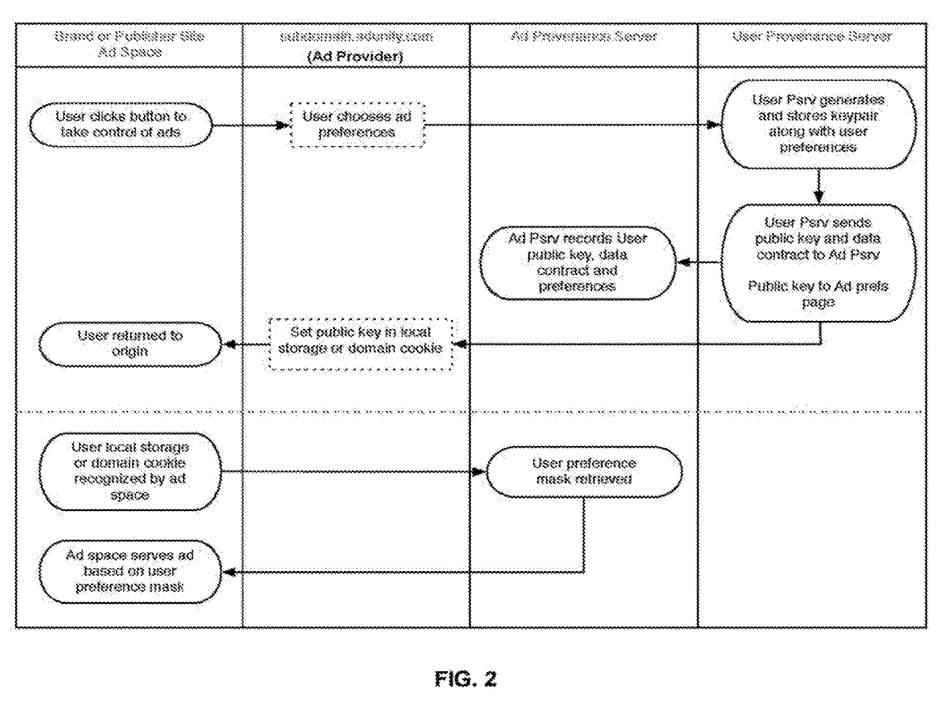
FIG. 2 shows a flow chart detailing the back-end processes enacted via the method of the present invention in order to facilitate seamless control over one's own Internet data with respect to advertisements.
Figure 3:
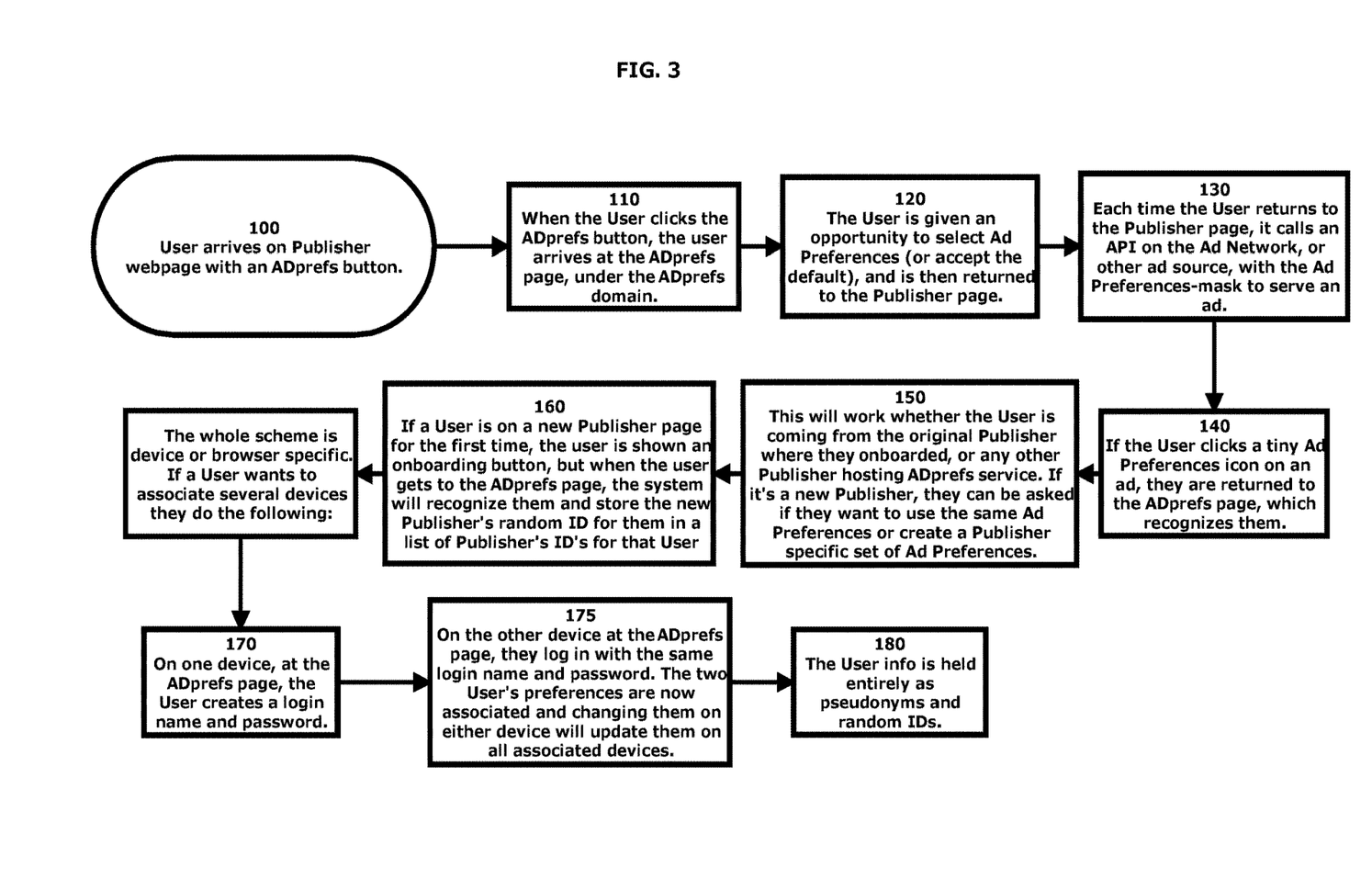
FIG. 3 details a flow chart showing the implementation and automated use of the system and method of the present invention.

The process of implementation and automated use of the system and method of the present invention, as shown in FIG. 3, is preferably enacted as follows:

1. User arrives on Publisher webpage with an ADprefs button. (100)
2. When the User clicks the ADprefs button, the user arrives at the ADprefs page, under the ADprefs domain. (110)
3. The User is given an opportunity to select Ad Preferences (or accept the default), and is then returned to the Publisher page. (120)
4. Each time the User returns to the Publisher page, it calls an API on the Ad Network, or other ad source, with the Ad Preferences-mask to serve an ad. (130)
5. If the User clicks a tiny Ad Preferences icon on an ad, they are returned to the ADprefs page, which recognizes them. (140) This will work whether the User is coming from the original Publisher where they onboarded, or any other Publisher hosting ADprefs service. If it's a new Publisher, they can be asked if they want to use the same Ad Preferences or create a Publisher-specific set of Ad Preferences. (150)
6. After first onboarding, if a User is on a new Publisher page for the first time, the user is shown an onboarding button, but when the user gets to the ADprefs page, the system will recognize them and store the new Publisher's random ID for them in a list of Publisher's ID's for that User. (160)
7. The whole scheme is device or browser specific. If a User wants to associate several devices they do the following:
    a. On one device, at the ADprefs page, the User creates a login name and password. (170)
    b. On the other device at the ADprefs page, they log in with the same login name and password. The two User's preferences are now associated and changing them on either device will update them on all associated devices. (175)
8. Note, neither Ad Network nor ADprefs is collecting any PII, and so by definition they are not sharing or selling any PII. The User info is held entirely as pseudonyms and random IDs. (180)

Figure 4:
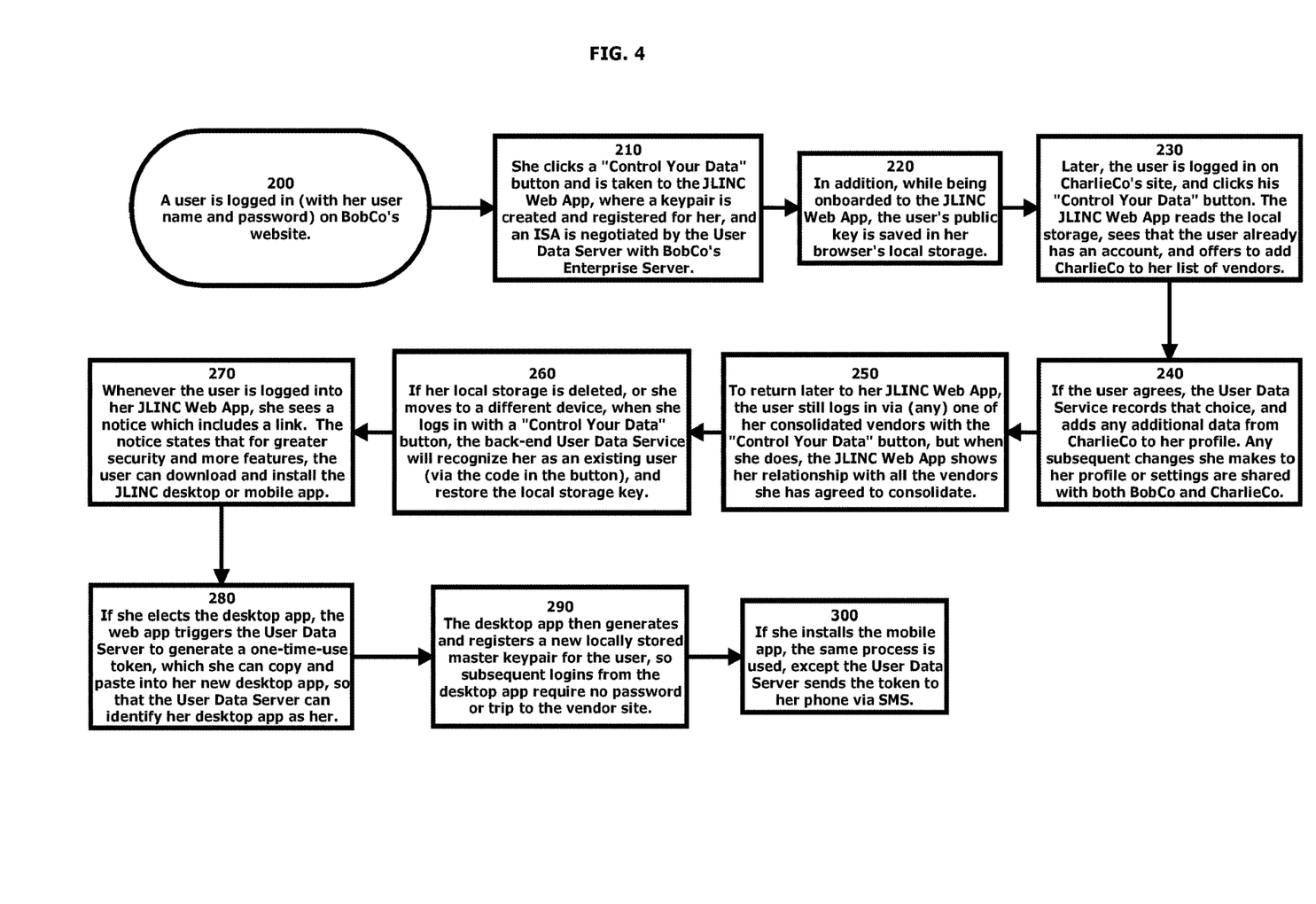
FIG. 4 exhibits a flow chart depicting the method steps of the present invention, showing the progression of Internet data as permission is inquired and acquired with respect to advertisements.

An example of an end user employing the JLINC system and interface of the present invention to control his or her advertising permissions and data usage is exemplified, as shown in FIG. 4, is as follows:

1. A user is logged in (with her user name and password) on BobCo's website. (200)
2. She clicks a "Control Your Data" button and is taken to the JLINC Web App, where a keypair is created and registered for her, and an ISA is negotiated by the User Data Server with BobCo's Enterprise Server. (210)
3. In addition, while being onboarded to the JLINC Web App, the user's public key is saved in her browser's local storage. (220) It could also be saved in a cookie, however presently the present invention does not require any cookies and so, therefore, the system does not require a cookie notice. Some browsers set in their default settings that when a site wants to write to local storage for the first time, the browser puts up a permission box for the user to check 'OK.'
4. Later, the user is logged in on CharlieCo's site, and clicks her "Control Your Data" button. The JLINC Web App reads the local storage, sees that the user already has an account, and offers to add CharlieCo to her list of vendors. (230)
5. If the user agrees, the User Data Sendee records that choice, and adds any additional data from CharlieCo to her profile. Any subsequent changes she makes to her profile or settings are shared with both BobCo and CharlieCo. (240)
6. To return later to her JLINC Web App, the user still logs in via (any) one of her consolidated vendors with the "Control Your Data" button, but when she does, the JLINC Web App shows her relationship with all the vendors she has agreed to consolidate. (250)
7. If her local storage is deleted, or she moves to a different device, when she logs in with a "Control Your Data" button, the back-end User Data Service will recognize her as an existing user (via the code in the button), and restore the local storage key. (260)
8. Whenever the user is logged into her JLINC Web App, she sees a notice which includes a link. The notice states that for greater security and more features, the user can download and install the JLINC desktop or mobile app. (270)
9. If she elects the desktop app, the web app triggers the User Data Server to generate a one-time-use token, which she can copy and paste into her new desktop app, so that the User Data Server can identify her desktop app as her. (280)

10. The desktop app then generates and registers a new locally stored master keypair for the user, so subsequent logins from the desktop app require no password or trip to the vendor site. (290)

11. If she installs the mobile app, the same process is used, except the User Data Server sends the token to her phone via SMS. (300)

Security Considerations

The web app of the present invention is only as secure as the logins for BobCo and CharlieCo. This is exactly the same situation as with OAuth, i.e. if a user logs into all used sites with FACEBOOK, and someone compromises the user's FACEBOOK account, they have access to all of the user's data.

Unfortunately, SMS as a second authentication factor is not as useful as it may seem. Essentially, if a malicious actor can hijack the user's phone account (which can be done), they own the user's SMS and likely the user's email as well. In such cases, the present invention encourages the use of YUBIKEYS (or similar) for security. It is predicted that eventually everyone will have two YUBIKEYS—one easily accessible, and one hidden away in the event that the first is lost or stolen.

A large number of variations may be present in the use of the system and method of the present invention. The previous description of the system focused primarily on volunteered personal data use cases. As previously noted, the system also includes use cases pertaining to advertising. It is envisioned that the system of the present invention also provides technical solutions to mandated compliance under PSD2 open banking rules or Know Your Customer rules, as well as GDPR requirements for personal data control and portability. It is envisioned that the system of the present invention may be employed with PSD2 APIs, in a manner which will allow a FinTech company to fulfill GDPR, with compliance handled via the system of the present invention. Presently, PSD2 requires banks to open an API, but then when the user gives a FinTech third party company that API access there is presently no way for that FinTech company to fulfill the GDPR requirements for personal data control. With JLINC, a FinTech provider can leverage the opportunity to expand into new business offered by PSD2, while also providing their customers granular control over their data required to comply with GDPR.

The system of the present invention may also be used for identity verification. For example, proof of identity, such as age or location/zip, is often required by some businesses which sell age-restricted items and services. In such domains, the system may be used to confirm that the user is indeed X years old, or is confirmed as physically in a certain location, and then the data may be shared according to this confirmed and legally obtained data.

Similarly, the system may be configured such that a third party counter-signs with a key, such as something like a hard identity qualification, including stating that the user is over 18, or saying that this is the child of the person as evidenced by this token, all without knowing the identity of the person. As such, the system can be used for child-proofing space for domains, even for anonymous users.

It should be understood that the system and method of the present invention need not be restricted to use in advertising, but instead extends to any and all agreements to be made securely by one or more parties over the Internet. While JSON-LD is employed as a graph language, it should be understood that other graph languages may be used in lieu of JSON-LD.

For example, it should be understood that another key advantage of the current invention is that it provides a mechanism for delegated consent, whereby one party may give consent for use of data, which may be shared by a second party under the authority of the first party, with additional third, or fourth parties, etc. The conditions may be automated, and may be set by the first party contingent on conditions which must be satisfied by the additional parties, and could also be combined with other conditions in a logical or Boolean manifold. For example, continue to share this data with car dealers that have inventory in a certain model, in a certain color, up until a specified date, or until notice is transmitted that the first party has completed a purchase and is no longer in the market. No party may retain the data or retransmit the data upon receipt of an instruction from the first party to delete it.

Such automated logical contractual hierarchy is not limited to business-to-consumer use case scenarios, but can also be employed in any commercial contract or supply chain, such as for example one where a potential customer places an open order for information, or to actually execute an automated purchase, based on the vendor meeting specified terms for the product specification, delivery date, financing terms, etc. The commercial contract could include pure financial instruments and trades in commodities, derivatives or other financial instruments or products.

It should be understood that an alternative commodity-backed trade credit could be established using the current invention where machine-readable contracts backed by one or more commodities are exchanged as trade credits. These credits serve as an inflation-resistant unit of exchange where liquidity is provided by the capability to express the units in contracts, which are both human and machine readable and can be inspected by a judge (unlike other previous blockchain-based contracts).

Similarly, it should be understood that a mutual-credit trade credit system could be established using the current invention wherein individuals and/or entities can extend credit to each other in the form of tradable IOU's. These tradable contracts constitute a method of creating liquidity among a network or community. The ability to automate contractual exchange and to associate identity with attributes which can be expressed as keys, which are in turn used to countersign the keys used to sign trade credit contracts, allows the present invention to provide the necessary missing infrastructure for a working community credit system.

Other versions include scenarios involving the Internet of Things (IoT), whereby a device creates data about, and/or on behalf of, an individual, or other entity, where the device signs the data before it is transmitted, and the use of that data is governed under an ISA between the individual or entity that uses the device and an entity that receives the data.

In another class of embodiments, data may be exchanged between two or more commercial entities in a business relationship where the contract governing the data is a complex legal document that has been negotiated between their respective legal departments to govern the exchange of particular data between their respective databases under specific terms and conditions on an automated basis possibly triggered by internal or external events, and/or by time cycle events.

In another class of embodiments, the chain of data provenance created by a sequence of commercial parties, each signing an ISA associated with the movement and processing of goods through a supply chain, may be used to help govern that supply chain. Here, the data provenance represents and verifies the physical chain of custody, or provenance, associated with the sequence of activity in a material supply chain. The cryptographically signed and verified documentation proving origin of raw materials or food inputs, and therefore the integrity of that supply chain, may also add value for the end user, or consumer, of the resulting product.

In another preferred class of embodiments, the protocol and system of the present invention may be used for three-party interactions, as detailed below.

The JLINC protocol of the present invention enables a more secure and flexible solution that addresses the requirements of both PSD2 and GDPR. The following is a description of the JLINC protocol as it applies to a three-party interaction:

The three actors involved in the system and implementation of the present invention, and their interacting cloud sendees, per an example interaction, are as follows:

The Bank, referenced as "BankCo."
The bank's agent the BankCo JLINC Solutions Sendee.
The Financial Technology company, referenced as "FinCo."
The Financial Technology company's agent the FinCo JLINC Solutions Service.
The end-user, the "data subject" in GDPR terms, or "resource owner" in OAuth terms, referenced as "Alice."
Her agent is the JLINC Data Sendee, which she accesses via her JLINC App.

Figure 5:
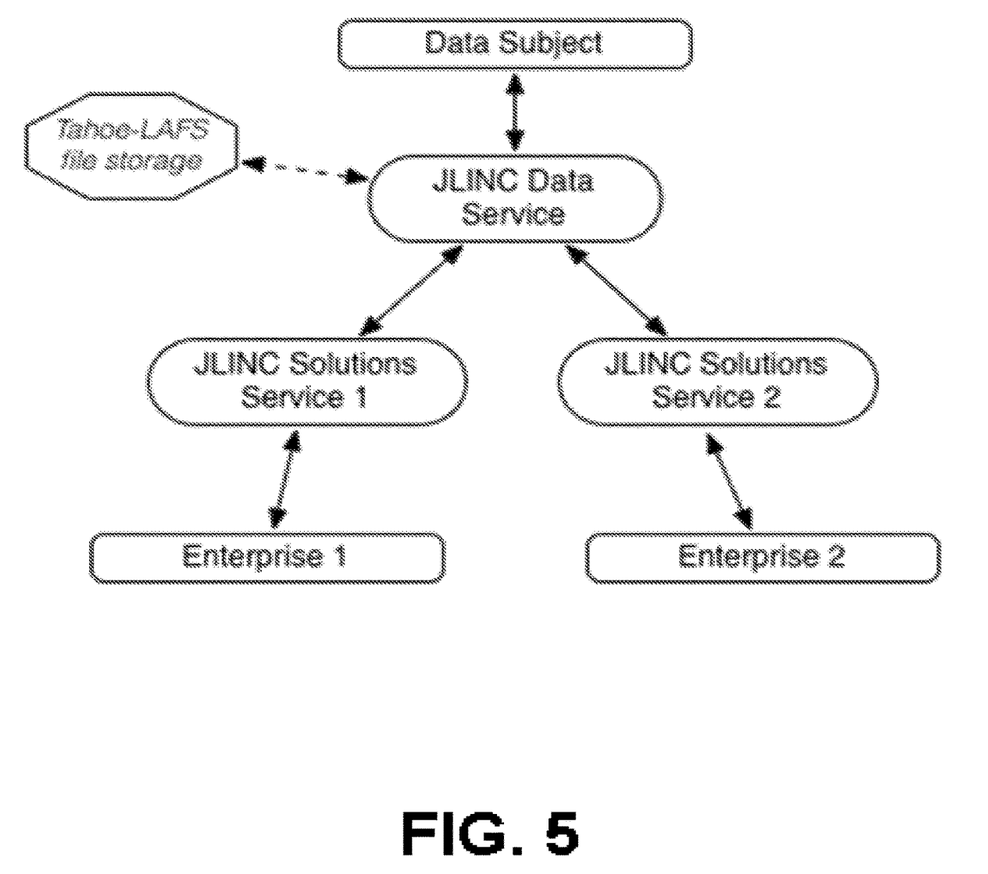
FIG. 5 depicts a flow chart showing the interaction between three parties and the JLINC Data Service of the present invention.

The interaction of the three parties can be seen in FIG. 5.

Alice can be initially onboarded to the system of the present invention (JLINC) via either BankCo or FinCo. For this discussion example, it is assumed she is being onboarded by BankCo, but the process is the identical, regardless of how Alice is onboarded to the system.

BankCo initializes each existing or new customer on its JLINC Solutions Service by sending the customer's account number or other ID that uniquely identifies the customer in the bank's records to the appropriate JLINC Solutions Service API. Then, the process is as follows:

1. JLINC Solutions Service contacts Alice's JLINC Data Service, which instantiates a key pair for this user (Alice) and sends the public key back to the JLINC Solutions Service as a pseudonymous identifier along with a proposed Information Sharing Agreement signed by Alice's private key.
2. The JLINC Solutions Service records the public key, counter-signs the Information Sharing Agreement, and returns it to Alice's JLINC Data Service. Both services can record this agreement with a third-party audit service as well. JLINC Solutions Sendee also at this time creates a one-time random ID and uses that ID to make a one-time-use URL that BankCo can present to Alice to bring her onboard.
3. The JLINC Solutions Sendee may also return along with the signed Information Sharing Agreement some data which the bank wishes to share and/or co-manage with Alice, which she can change, update or withdraw at any time in accordance with the Information Sharing Agreement.
4. When Alice accesses the URL, she is brought to the JLINC Data Service login page. When she logs in, the new pseudonym is associated with her account. If she does not yet have an account, she can register a new account, and the pseudonym is then associated with her new account.

Alice can add a FinCo account to her JLINC Data Service by selecting it in her JLINC app. The process works similarly to the above, except in reverse. This process is preferably as follows:

1. First, the JLINC Data Service generates a new key pair for Alice, and sends the public key to the FinCo JLINC Solutions Service with a signed proposed Information Sharing Agreement.
2. The FinCo JLINC Solutions Service counter-signs the Information Sharing Agreement and returns it to the JLINC Data Service. It messages the FinCo API to create a new customer record and records the new customer ID.
3. FinCo can then request data from Alice's JLINC Data Service. Alice will have pre-authorized a certain profile or data set when she initiated the FinCo account request, which she can change, update or withdraw at any time. The data that has been authorized by Alice to share may include BankCo data that Alice has received from BankCo according to the Information Sharing Agreement.

The list of available JLINC Solutions Services that Alice can choose to add to her JLINC Data Service is created and maintained by an out-of-band registration process that establishes a unique API key and API secret shared between that JLINC Solutions Service and her JLINC Data Service.

All communications between the respective services are conducted over encrypted sessions (generally TLS), but for further security two other measures are required.

First, all messages include the sender's API key, and are formatted as JSON Web Tokens protected by an HMAC section using the shared API secret, thus mitigating a man-in-the-middle attacker from altering the message in transit between the services without detection.

Additionally, the contents of the message are encrypted with the intended recipient's public key for that relationship. Thus only the possessor of Alice's corresponding private key can read the contents of the message, and any attempt to alter the message contents will fail.

PSD2 Services

To implement PSD2 services, FinCo needs to access BankCo's PSD2-required APIs on Alice's behalf. The method for enabling this currently under consideration by relevant standards bodies is an OAuth2 framework. The preferred steps of this method are as follows:

1. First, the present invention employs an extension to OAuth2 to allow Alice and/or her JLINC Data Service to authenticate at BankCo with a key challenge rather than a username and password.
2. Next, Alice indicates to FinCo (either logged in at the FinCo site, or by pre-arrangement) that she wishes FinCo to perform some action involving BankCo on her behalf.
3. Then, under an existing ISA (a hash of the ISA is included in the request), FinCo's JLINC Solutions Services calls an API at Alice's JLINC Data Service to request a capability from BankCo.
4. Next, Alice's JLINC Data Service in turn makes an API call to BankCo's JLINC Solutions Service for the capability, including a hash of Alice's ISA with BankCo.

5. Next, BankCo's JLINC Solutions Service presents Alice's public key to BankCo's authentication API in lieu of a username.
6. Next, BankCo returns an authentication challenge, a random number or string. Crucial to the security of this step, the challenge must be of sufficient length and sufficiently random, and must never be reused. BankCo's JLINC Solutions Service preferably includes a check to prevent challenge reuse.
7. Then, BankCo's JLINC Solutions Service encrypts the challenge with Alice's public key and sends it to her JLINC Data Service. Her JLINC Data Service decrypts the challenge, signs it with Alice's private key, re-encrypts the signed challenge with BankCo's public key, and sends it back.
8. Then, BankCo's JLINC Solutions Service decrypts the signed challenge with BankCo's private key if BankCo does not have the ability to do this itself, and in any case presents the signed challenge to BankCo.
9. Next, BankCo verifies the signature with Alice's public key and then returns an OAuth token. This step is in lieu of the standard OAuth technique where Alice would have been redirected to and authenticated at BankCo's site, and then been redirected to FinCo with the OAuth token.
10. Then, BankCo's JLINC Solutions Service encrypts the token with Alice's public key and transmits it to Alice's JLINC Data Service. Alice's JLINC Data Service decrypts the token, re-encrypts it with FinCo's public key and transmits it to FinCo's JLINC Solutions Service.
11. Finally, FinCo's JLINC Solutions Service decrypts the token and presents it to FinCo to use as per the established OAuth framework.

At the conclusion of this process, the system of the present invention has presented a BankCo generated capability to FinCo, but has significantly mitigated the ability of a 'man-in-the-middle' attacker to replay the transaction, or to steal Alice's credentials or her OAuth token. By placing Alice at the center of the data event, the system of the present invention has given her visibility into, and control over, the whole process.

JLINC Solutions Service Connectors

An enterprise/business/entity may connect its data source(s) to a JLINC Solutions Service either with a direct CRM to JLINC Solutions Service database connector (for example the PostgreSQL database system's foreign data wrapper mechanism), or by using the JLINC Solutions Service API.

Onboarding New End-Users

An enterprise may initialize existing or new customers on its own JLINC Solutions Service in two ways. If the enterprise is using a direct CRM to JLINC Solutions Service database connector, then the JLINC Solutions Service database triggers the creation of a random one-time-use identifier. Otherwise the enterprise may send the customer's account number or other ID that uniquely identifies the customer in the enterprise's records to the appropriate JLINC Solutions Service API.

Then, in either case:
1. First, the JLINC Solutions Sendee of the present invention contacts the new end-user's JLINC Data Service, which instantiates a key pair for this user and sends the public key back to the JLINC Solutions Service as a pseudonymous identifier along with a proposed Information Sharing Agreement signed by the new end-user's private key.
2. Then, the JLINC Solutions Sendee records the public key, counter-signs the Information Sharing Agreement, and returns it to the new end-user's JLINC Data Sendee. Both services can record this agreement with a third-party audit service as well. JLINC Solutions Service also at this time creates a one-time random id, or uses the one created by the database trigger if that is the case, and uses that id to make a one-time-use URL that BankCo can present to the new end-user via email or other means to bring her onboard.
3. Then, the JLINC Solutions Service may also return along with the signed Information Sharing Agreement some data which the bank wishes to share and/or co-manage with the new end-user, which she can change, update or withdraw at any time in accordance with the Information Sharing Agreement.
4. When the new end-user accesses the URL, she is brought to the JLINC Data Service login page. When she logs in, the new pseudonym is associated with her account. If she does not yet have an account she can register one, and the pseudonym is then associated with her new account.

JLINC Audit Service

As part of the JLINC protocol of the present invention, all parties to any data event may each specify a JLINC Audit Service. The protocol requires that each party so notified transmit, within a reasonable period of time, a copy of the signed data event receipt that was created as part of the data event to the specified JLINC Audit Sendee.

The JLINC Audit Service matches receipts and issues a notification to all parties involved if, after a period of time, it has not received matching receipts from both or all parties to the data event in question. These receipts are designed to offer cryptographically non-refutable proof that the parties agreed to the data exchange in question.

The JLINC Audit Service of the present invention also provides a key-registration service that registers public keys for all parties that use the service. In the event that a corresponding private key is compromised or withdrawn from service for any reason, the JLINC Audit Service records that fact, along with a public key that has superseded the invalid one if applicable. If a receipt is received by the JLINC Audit Service containing an invalid public key, the service returns a notice to that effect, along with any information about superseding keys. The JLINC Audit Service also provides an API to check public keys for validity and supersession directly.

It should be understood that the protocol and tech of the system and method of the present invention may be deployed in any situation where there are multiple parties relating to the exchange of data on a permissioned basis.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

What is claimed is:

1. A method for data usage control, comprising:
using one or more computer processors, in response to one or more user inputs received at one or more user interfaces of one or more computing devices:
establishing a cryptographically signed Information Sharing Agreement (ISA) between a first party and one or more other parties;
automatically granting tailored permission, based on the ISA, related to use of the first party's data and related to transference of the first party's data between databases;
automatically allowing and governing an automated data exchange, based on the ISA, between the first party and the one or more other parties, of the first party's data;
automatically allowing and governing an automated data exchange, based on the ISA, between the one or more other parties and one or more additional parties, of the first party's data; and
receiving, at the one or more computer processors, an indication of an audit service from one of the parties and, using the audit service, receiving a first signed data event receipt corresponding to a first data event.

2. The method of claim 1, further comprising preventing the automated data exchange, between the one or more other parties and the one or more additional parties, until the one or more computer processors receive an indication of agreement of the one or more additional parties to the ISA.

3. The method of claim 1, further comprising, using the audit service, issuing a notification to one of the parties involved in the first data event from which the audit service has not received a matching signed data event receipt.

4. The method of claim 1, further comprising automatically perpetuating terms of the ISA by requiring a new party to cryptographically sign the ISA before receiving the first party's data from one of the one or more other parties.

5. The method of claim 1, further comprising capturing and storing a hashed audit record of all data events of the first party's data, signed by each of the other parties who have participated in any of the data events, establishing one or more chains of custody of the first party's data.

6. The method of claim 1, further comprising receiving and storing, by a software agent associated with the first party or one of the one or more other parties, a record of each data event in which that party has participated.

7. The method of claim 1, further comprising, based on the ISA, restricting or withdrawing a previously-allowed usage of the first party's data in response to one or more selections from the first party.

8. The method of claim 1, wherein the first party's data is automatically generated by an Internet of Things (IoT) device.

9. The method of claim 1, wherein one of the one or more other parties comprises a device.

10. The method of claim 1, further comprising verifying one of an age of the first party, an identification of the first party, a location of the first party, and a verifiable attribute of the first party, and transferring the first party's data to the one or more other parties only after the verification has occurred.

11. The method of claim 10, further comprising effecting the verification based on receiving a countersigning with a key, from a countersigner who is not the first party, without receiving an identity attribute of the first party so that the first party remains anonymous.

12. A system for data usage control, comprising:
one or more non-transitory, computer-readable media having instructions that, when executed by one or more processors, cause the one or more processors to:
establish a cryptographically signed Information Sharing Agreement (ISA) between a first party and one or more other parties;
automatically grant tailored permission, based on the ISA, related to use of the first party's data and related to transference of the first party's data between databases;
automatically allow and govern an automated data exchange, based on the ISA, between the first party and the one or more other parties, of the first party's data;
automatically allow and govern an automated data exchange, based on the ISA, between the one or more other parties and one or more additional parties, of the first party's data; and
based on the ISA, facilitate automatic usage of the first party's data by the one or more other parties or automatic transfer of the first party's data to the one or more other parties, in response to one or more trigger events;
wherein the one or more trigger events comprises one of: arrival of a date; arrival of a time; alignment of financing terms between the first party and the one or more other parties; alignment of price between the first party and the one or more other parties; and alignment of a product or service requested by the first party and a product or service able to be provided by the one or more other parties.

13. The system of claim 12, wherein the instructions further cause the one or more processors to, based on the ISA, facilitate an automatic financial transaction between the first party and one of the one or more other parties in response to one or more of the trigger events.

14. A method for online contractual generation and validation, comprising:
using one or more computer processors, in response to one or more user inputs received at one or more user interfaces displayed on one or more computing devices:
generating a hash of a draft contract;
adding cryptographic signatures to the hash from a first party and one or more other parties, thereby establishing a cryptographically signed hash which validates a finalized contract, wherein the cryptographically signed hash comprises the hash and the cryptographic signatures;
automatically providing the cryptographically signed hash to the first party and the one or more other parties; and
receiving an indication of an audit service from the first party and each of the one or more other parties, and automatically providing the cryptographically signed hash to the audit services of the first party and the one or more other parties.

15. The method of claim 14, further comprising, using the one or more computer processors, governing an exchange of data between the first party and the one or more other parties under one or more terms of the finalized contract.

16. The method of claim 14, further comprising, using the one or more computer processors, generating the draft contract in response to the one or more user inputs.

17. The method of claim 14, wherein the finalized contract does not govern an exchange of data between the first party and the one or more other parties.

* * * * *